United States Patent [19]

Gray

[11] Patent Number: 5,028,472

[45] Date of Patent: Jul. 2, 1991

[54] FASTENING MEANS FOR CUSTOM-FIT SEAT COVERS

[75] Inventor: Jordan B. Gray, Newport Beach, Calif.

[73] Assignee: Legend Design, Irvine, Calif.

[21] Appl. No.: 250,386

[22] Filed: Sep. 28, 1988

[51] Int. Cl.⁵ ................................................ B32B 3/06
[52] U.S. Cl. ...................................... 428/100; 150/158; 297/218; 297/219; 297/DIG. 6; 428/304.4
[58] Field of Search ............................ 428/100, 304.4; 150/158; 297/DIG. 6, 218, 219, 220

[56] References Cited

U.S. PATENT DOCUMENTS

| | | | |
|---|---|---|---|
| 3,185,197 | 5/1965 | Spiro et al. | 428/100 X |
| 3,248,147 | 4/1966 | Testa | 428/100 X |
| 3,295,577 | 1/1967 | Danielson | 428/100 X |
| 3,308,490 | 3/1967 | Cacioppo | 428/100 X |
| 3,310,091 | 3/1967 | Geisen et al. | 428/52 X |
| 3,654,059 | 4/1972 | Zisblatt | 428/137 X |

OTHER PUBLICATIONS

Brochure Describing "Tempo" Fabric published for Morgan Fabrics (undated), 4265 Exchange Ave., Los Angeles, Calif., 90058

*Primary Examiner*—Henry F. Epstein
*Attorney, Agent, or Firm*—Price, Gess & Ubell

[57] ABSTRACT

Seat covers for motor vehicle seats and the like are made from a relatively inelastic material that is soft to the touch, but durable, and highly porous. Such material can be purchased under the trade name "Tempo." Each seat cover is custom made for a certain style and size of seat, generally in two or three pieces, one to cover the back, one to cover the bottom, and one to cover the headrest. The pieces have fastening means attached at their respective openings which include the hook part of a Velcro fastener. The seat cover material acts as the loop part. The back cover, the bottom cover and the headrest cover are snugly adjusted by this fastening means on installation and throughout the life of the seat cover.

8 Claims, 2 Drawing Sheets

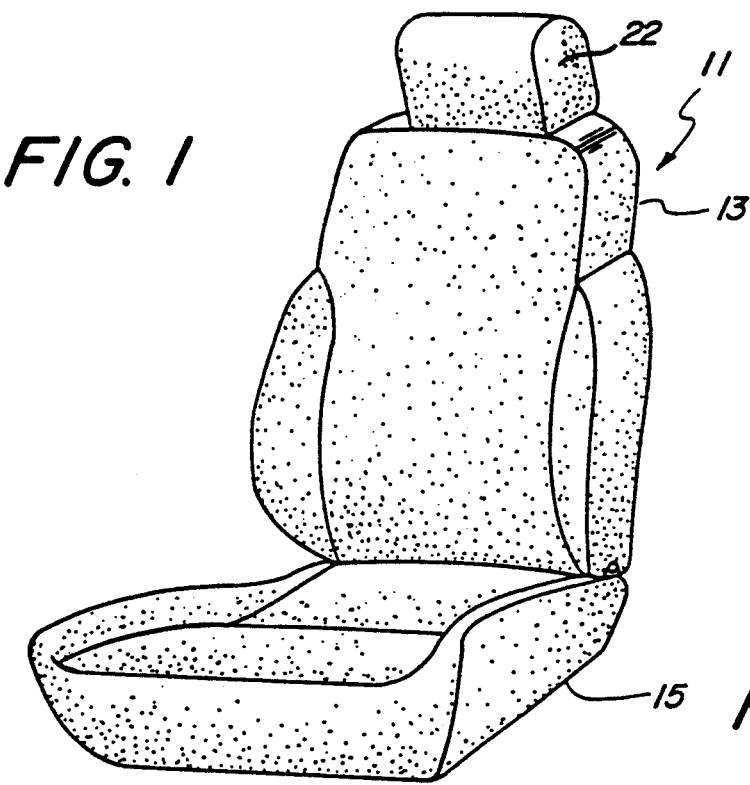
FIG. 1
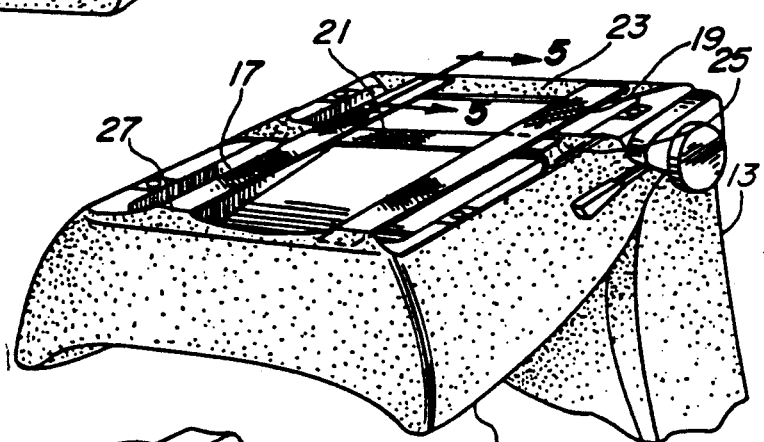
FIG. 2
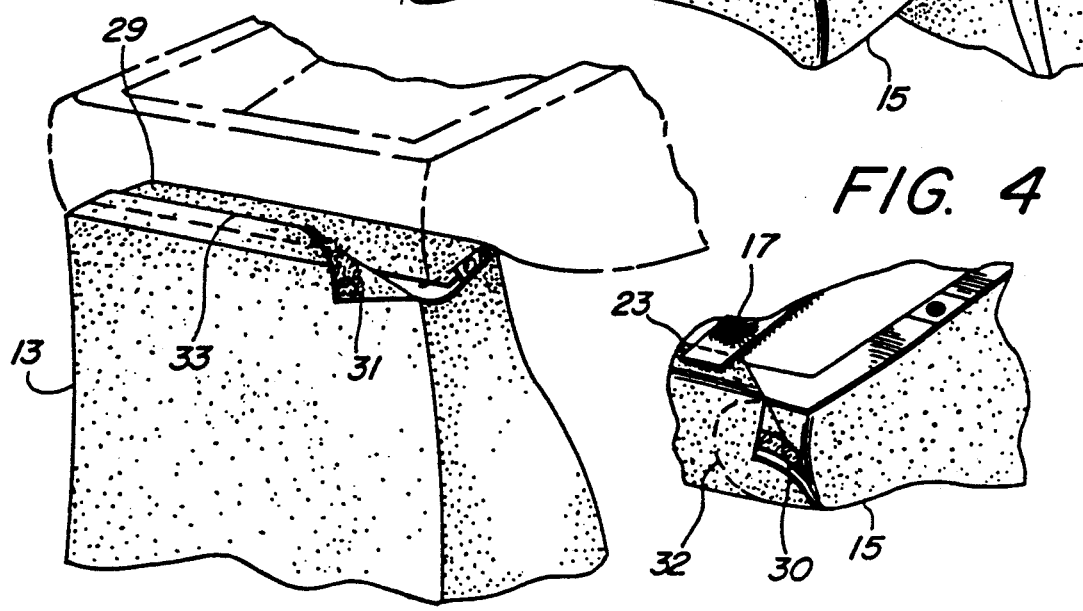
FIG. 3
FIG. 4

FASTENING MEANS FOR CUSTOM-FIT SEAT COVERS

BACKGROUND OF THE INVENTION

1. Field of the Invention

The present invention relates generally to improvements in seat covers, and more particularly pertains to new and improved fastening means for seat covers utilized in motor vehicles.

2. Description of the Prior Art

In the field of motor vehicle seat covers, it has been the practice to employ elasticized stretchy material from which the seat cover is manufactured. The result is that the seat covers seldom appear to be tight-fitting and custom even at the time of initial installation. Then, as the elasticized fibers in the material begin to lose their resiliency, the seat covers become even more and more baggy and ill-fitting. In addition, the inferior fastening means utilized in prior art use stretchy elastic bands and hooks which cannot keep the seat cover in place during use, resulting in a rumpled and baggy appearance at all times. These fastening means are incapable of providing for fastening adjustment. Also, fastening means used in prior art seat covers are readily visible and unsightly.

SUMMARY OF THE INVENTION

A relatively inelastic soft, but durable material is custom cut and made into covers for motor vehicles. Separate covers are made for the headrest, seat back, and seat bottom. Each cover is held fast by pulling a pile fastening hook portion into position and pressing it directly to the seat cover material having a loop pile construction, eliminating a need to sew the loop pile fastening portion to the cover fabric. In addition, the fastening means provides infinite adjustability over the life of the product. The fastening means is not visible, creating an attractive custom-tailored appearance.

BRIEF DESCRIPTION OF THE DRAWINGS

The objects and many of the attendant advantages of this invention will be readily appreciated as the same becomes better understood by reference to the following detailed description when considered in conjunction with the accompanying drawings, in which like reference numerals designate like parts throughout the figures thereof, and wherein:

FIG. 1 is a three-dimensional perspective of an automobile seat with the seat cover of the present invention installed;

FIG. 2 is a three-dimensional perspective of the bottom part of the seat cover installed showing the fastening means;

FIG. 3 is a three-dimensional perspective of the back rest from the bottom showing the back rest fastening means of the invention;

FIG. 4 is a sectional perspective showing the bottom of the seat cover fastening means;

DETAILED DESCRIPTION OF THE PREFERRED EMBODIMENTS

Figure 6:
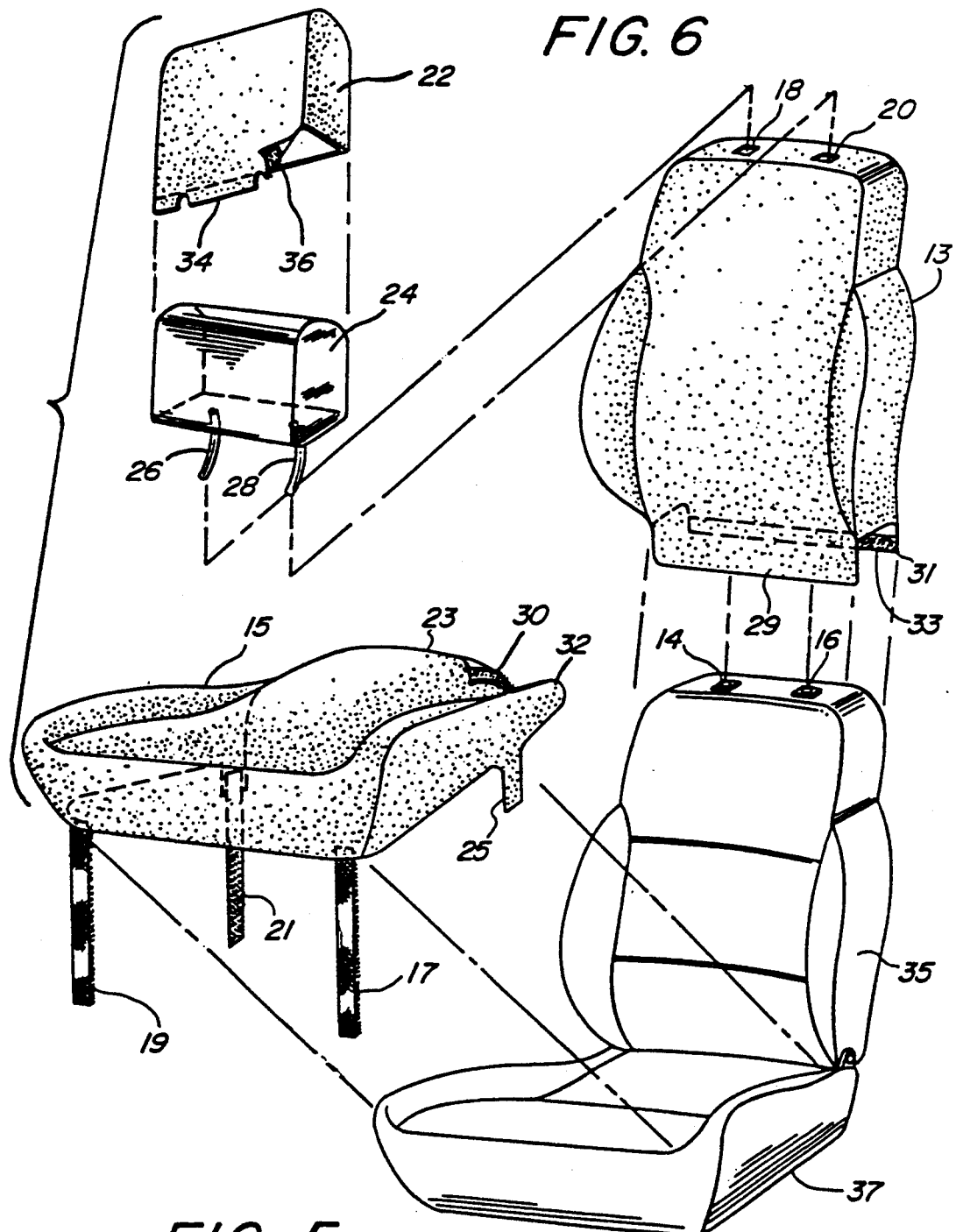
FIG. 6 is an exploded view showing the automobile seat and the cover sections therefor.

FIG. 1 illustrates the seat cover 11 of the present invention installed on an automobile seat. The seat cover 11 has a back portion 13, a bottom portion 15 and a headrest portion 22. As is illustrated in FIG. 1, the fit of the seat cover, both the back portion 13, the bottom portion 15, and the headrest portion 22 is as good as that of the original equipment. This is the result of the material utilized, a material that is substantially inelastic, is extremely durable, and has a laminate structure. The preferred fabric is 100% nylon on the wear surface with a polyester foam core and a tricot backing. A fabric of this type is sold under the trade name "TEMPO" by various distributors, and is made by Guilford Mills of Greenville, N.C.

Referring now to FIG. 2, the reason for the custom fit of the bottom part 15 on the automobile seat is illustrated. The fastening mechanism of the present invention is the main reason. The manner in which the bottom cover 15 attaches to the seat bottom 37 of the seat is more clearly illustrated in the expanded view of FIG. 6. Before the bottom portion 15 is applied to the seat bottom 37, it can be seen that a plurality of hook pile fastening straps 17, 19 and 21 are sewn to the bottom portion 15 at various points along its edge. In addition, a tab of material 25 is cut into the bottom portion 15 at one side, while another tab of material 23 is provided for in the bottom portion 15 at a back side. Two hook pile fastening straps 17 and 19 are attached to the front of the bottom portion 15 opposite the back side tab 23. Another hook pile fastening strap 21 is attached to the side of bottom portion 15 towards the back end in line with extended tab 25. The back tab of material 23 has a hook pile fastening strap 30 sewn thereon at one end. This hook pile fastening strap overlay the material tab 32 when it is tucked under upon installation. Once the seat portion 15 is on the bottom seat 37, the hook pile fastening tab 21 is pulled tight and fastened to extending tab 25 on the opposite side. Tab 25 is simply a piece of the seat cover material itself. This allows the hook pile fastening material of tab 21 an unlimited degree of adjustability.

The two hook pile fastening tabs 17 and 19 attached to the front of the bottom portion 15 are sewn to the underside of the front material 27. The tabs 17 and 19 are pulled tight and overlap the back seat cover material tab 23. Here again, a wide latitude of adjustability is provided because the hook pile fastening tabs 17 and 19 simply engage and fasten to the upholstery material 23. Hook pile fastening strap 30 on back seat cover tab 23 overlay back side tab 32 and holds it snug.

The manner in which the back rest portion 13 of the seat cover fits onto the back 35 of the seat is illustrated in FIG. 3. Reference should also be made to FIG. 6, wherein the manner in which back portion 13 fits onto the back 35 of the seat is illustrated. As can be seen in FIG. 6, the back rest portion 13 simply slips over the back 35. The apertures 18 and 20 and back rest portion 13 fit around the boss frames 14 and 16 in the back rest 35, thereby providing a custom fit and appearance at the top. Once the back rest portion 13 is slid over the back 35, the front flap 29 is turned under. The back flap 33, having a hook pile fastening strap 31 sewn on its edge, is pulled tight to overlay flap 29 and fasten thereto. Here again, a large latitude of adjustability is provided to adjust the tightness of the fit on installation and during the life of the cover, as the material wears with age.

Referring now to FIG. 4, it can be seen that the hook pile fastening strap 17 is that portion of a Velcro-type material that has hooks therein. This type of material is illustrated and described in U.S. Pat. No. 2,717,437 issued Sept. 13, 1955. The material portion 23 to which the hook pile fastening strap attaches is the seat cover material itself. The seat cover material allows the hook pile fastening strap to fasten to it. The back tab 23 is shown overlying the side tab 32. The hook pile fastening strap 30 holds side tab 32 snug, thereby contributing to the custom appearance of the seat cover throughout its life.

Figure 5:
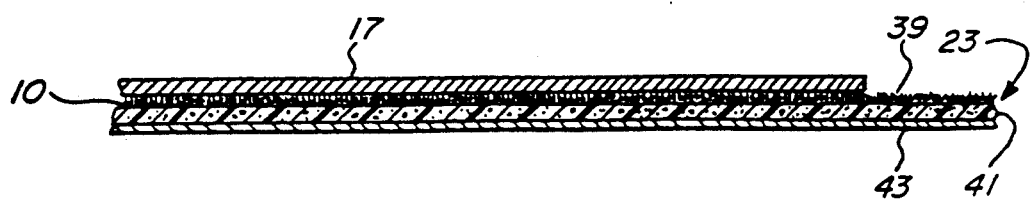
FIG. 5 is a cross-section along 5—5 of FIG. 2 showing the material and the fastening means in an engaged position.

FIG. 5 illustrates, in cross-section, the fastening means and the seat cover material structure of the present invention. The cross-section is taken along 5—5 of FIG. 2. The hook pile fastening strap 17 which overlays the nylon loop material 39 is shown to have a plurality of hook members 18 attached thereto which engage the cloth material 39. FIG. 5 illustrates the preferred embodiment of the seat cover material 23 as being a material which is a laminate of a nylon wear surface 39 with a polyester foam core 41 sandwiched between the wear surface 39 and a tricot cloth 43. This type of material is sold under the trade name "TEMPO." This type of material is relatively inelastic, has exceptional durability characteristics, is highly stain-resistant, and has a Class A fire rating. Its breaking strength, tear strength, percentage shrinkage and durability all exceed, by many factors and degree, the NAFM requirements.

FIG. 6 shows more clearly how the headrest cover 22 fits over the headrest 24 and fastens thereto. The headrest 24 has a pair of support rods 26, 28 extending therefrom which slip into the apertures within box frames 14 and 16, as is common for seats of this type. The headrest cover 22 is custom cut to fit this headrest. It has a closure flap 34 at one end of the opening. A hook pile fastening strap 36 is sewn along the width of the flap 34. When the cover is on the headrest the flap 34 is pulled tight to overlay the material with the hook pile fastening strap 34. The hook pile fastening strap closes the cover of the headrest underneath at the support rods 26, 28. When installed, the closure for the headrest is unobtrusive and presents a very clean line.

Coupling this cover material with the fastening means of the present invention, which allows adjustability upon installation and throughout the life of the cover, provides for a seat cover of exceptional quality and appearance throughout the life of the product.

What is claimed is:

1. In a seat cover, a means for fastening the cover material around a portion of the seat to be covered, said fastening means comprising:
    a seat cover material having a loop pile fastening structure and being relatively inelastic, and soft but durable, said seat cover material being shaped to substantially conform to the portion of the seat to be covered; and
    a plurality of hook pile fastening tabs connected to said seat cover material, said hook pile fastening tabs wrapping around the portion of the seat to be covered and opposing a loop pile surface of said seat cover material, said hook pile fastening tabs being removably fastenable to the loop pile surface of the seat cover material;
    whereby the hook pile fastening tabs wrap around the portion of the seat to be covered and are adjustable over any desired portion of the loop pile surface of the seat cover material.

2. The fastening means for seat covers of claim 1 wherein said seat cover material comprises a three-layer laminate construction of loop-type nylon cloth bonded to an inner core of polyester foam bonded to a tricot backing.

3. The fastening means for seat covers of claim 1 wherein a separate cover is used for the bottom part, a separate cover is used for the back part, and a separate cover is used for the headrest.

4. The fastening means for seat covers of claim 1 wherein the cover is custom cut to fit a seat of a particular size and shape.

5. The fastening means of claim 4 wherein a separate cover is used for the bottom part, a separate cover is used for the back part of the seat cover, and a separate cover is used for the headrest.

6. The fastening means of claim 5 wherein the bottom part has a plurality of hook pile fastening straps, said hook pile fastening straps fastening to the seat cover material.

7. The fastening means of claim 6 wherein the back part has a hook pile fastening strap sewn to the seat cover material so as to overlay a flap of seat cover material.

8. The fastening means of claim 7 wherein the headrest part has a hook pile fastening strap sewn to the headrest cover material so as to overlay the cover material when installed.

* * * * *